United States Patent [19]

Goodsmith et al.

[11] Patent Number: 4,998,659
[45] Date of Patent: Mar. 12, 1991

[54] SELF-ATTACHING FASTENER INSTALLATION HEAD

[75] Inventors: Dale H. Goodsmith, Brighton; Harold T. Woods, Livonia, both of Mich.

[73] Assignee: Multifastener Corporation, Detroit, Mich.

[21] Appl. No.: 437,247

[22] Filed: Nov. 16, 1989

[51] Int. Cl.⁵ .............................................. B23P 19/00
[52] U.S. Cl. .......................................... 227/7; 227/119
[58] Field of Search .................... 227/7, 86, 61, 116, 227/119; 83/168; 408/16

[56] References Cited

U.S. PATENT DOCUMENTS

| | | | |
|---|---|---|---|
| 2,936,802 | 5/1960 | Skoog | 83/168 |
| 3,800,643 | 4/1974 | Scott et al. | 83/100 |
| 4,242,158 | 12/1980 | Olson | 156/92 |
| 4,340,326 | 7/1982 | Buonauro et al. | 408/16 |
| 4,700,470 | 10/1987 | Muller | 29/798 |
| 4,858,289 | 8/1989 | Speller, Sr. | 29/34 B |

FOREIGN PATENT DOCUMENTS 1357114 12/1987 U.S.S.R. ................... 83/168

Primary Examiner—Douglas D. Watts
Assistant Examiner—John M. Husar
Attorney, Agent, or Firm—Dykema Gossett

[57] ABSTRACT

An installation head for attaching self-attaching fastening elements, including self-clinching, self-riveting and self-piercing fasteners. The installation head of this invention includes a self-cleaning means built into the installation head for cleaning the fastener sensing means, such as a conventional proximity switch, each time a fastener is installed by the installation head. The installation head may be a conventional installation head, including a first passage receiving the fastening elements, a second passage intersecting the first passage through which a plunger reciprocates to install the fasteners and a fastener sensor means, such as a proximity switch, in the second passage opposite the first passage to sense the presence of a self-attaching fastening element ready for installation beneath the free end of the plunger. The cleaning means in the improved installation head of this invention comprises an air passage in the plunger having an outlet adjacent the free end of the plunger, preferably angularly directed toward the fastener sensor means, which sweeps across the sensor means with each stroke of the plunger, thereby cleaning the fastener sensor means of oil, burs, chips and other debris which may collect on the fastener sensor means during normal operation. In the most preferred embodiment, the plunger includes a plurality of generally parallel ports directing a plurality of air jets toward the fastener sensor means, sequentially sweeping across the sensor means as the plunger reciprocates through the second passage to install a self-attaching fastening element.

12 Claims, 2 Drawing Sheets

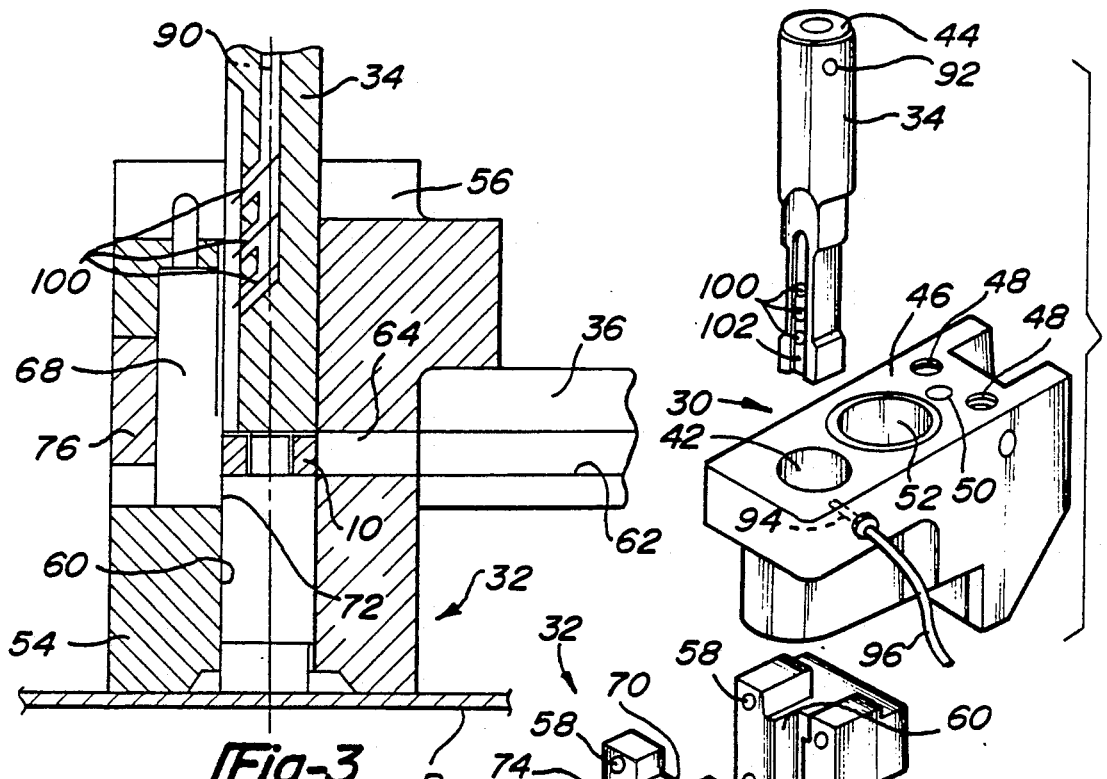
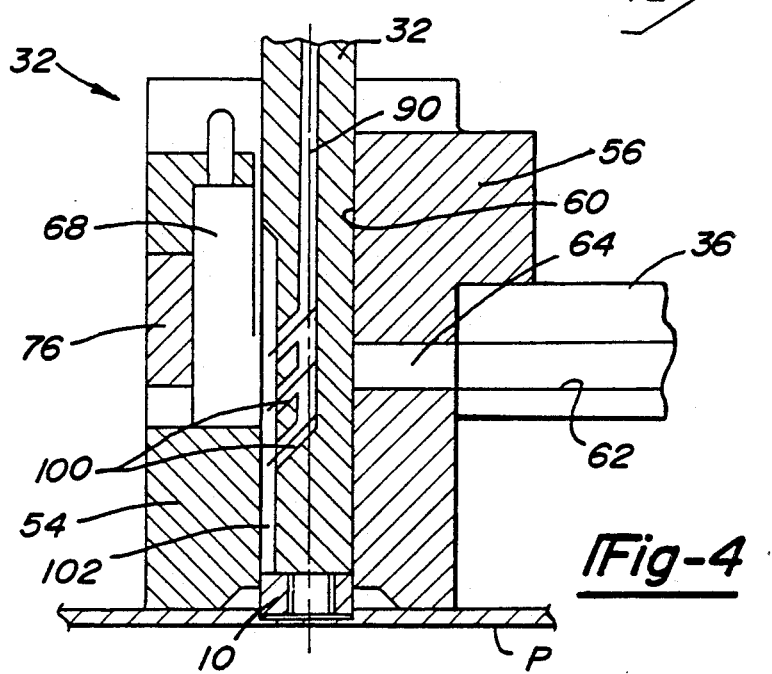

SELF-ATTACHING FASTENER INSTALLATION HEAD

FIELD AND BACKGROUND OF THE INVENTION

The present invention relates to installation heads of the type installed in die presses to install self-piercing, self-clinching and self-riveting fasteners or fastening elements. More particularly, the installation head of this invention includes a means for cleaning the fastener sensor probe or switch, which is normally interconnected to the control of the die press, such that the die press is not actuated if a self-attaching element is not located ready for installation.

Self-attaching fasteners or fastening elements, such as pierce nuts, rivets, weld nuts, self-piercing studs and the like, are used today in many mass production applications, including automotive manufacturing. Pierce nuts and self-piercing studs are used by the automobile industry, for example, to interconnect various structural elements and to connect body panels to structural elements. Several such self-attaching fasteners may be attached to a structural element or a body panel at a time, generally in a die press. The die press may also be utilized to simultaneously form the structural element or body panel and install several self-attaching fasteners. A sheet of steel may be inserted in a die press, for example, which includes a plurality of installation heads. When the die press is closed to form a configured panel or structural element, the self-attaching fasteners are simultaneously installed in the panel or structural element by the installation heads.

In a typical application, one of the die shoes includes a plurality of installation heads which receive the self-attaching fasteners or fastening elements from a hopper or coiled reel and the opposite die shoe includes aligned die buttons. When the press is closed, the self-attaching fasteners are driven into the panel by a reciprocating plunger in the installation head to pierce the panel and the panel surrounding the pierced opening is simultaneously clinched to the self-attaching fasteners by the die buttons. Self-attaching fasteners may also be attached in pre-pierced panel openings by a similar process.

Because several operations may be performed simultaneously in the die press, as described, it is essential in such applications that means be provided to signal the presence of the self-attaching fasteners in the installation heads ready for installation. In a typical installation, a fastener sensor means, such as a proximity switch, is located in the installation head, which is interconnected electrically to the control panel of the die press. If the proximity switch senses that a self-attaching fastener or fastening element is not located in the installation head ready for installation, the die press cannot be actuated and a signal is normally provided to indicate which head requires servicing. Although such installation heads are normally rugged and relatively simple in operation, one or more of the installation heads may require service or the supply of self-attaching fastening elements may be exhausted. It is also possible for the self-attaching fastening elements to become jammed in the feed system, rendering the installation head temporarily inoperative.

If, however, the fastener sensor means becomes fouled with oil, burs, chips or other debris, the sensor means may indicate the presence of a self-attaching fastening element in the installation head ready for installation when no fastener is located beneath the plunger, ready for installation. When this happens, the installation head is cycled, but no fastening element is installed by the installation head. There is, therefore, a necessity for periodically cleaning the fastener sensor element. At present, this is accomplished by interrupting the operation of the die press and cleaning the windows of the proximity switches, as necessary based upon experience. The installation heads of the type described herein have been utilized to install pierce nuts as disclosed in U.S. Pat. Nos. 3,098,576, 3,718,965, 3,942,235, 3,946,478 and 3,961,408, all assigned to the assignee of the instant invention. U.S. Pat. No. 4,505,416 discloses a simplified pierce nut installation head, which is also assigned to the assignee of the present invention. U.S. Pat. No. 4,555,838 discloses an improved self-piercing stud and installation head and U.S. Pat. No. 4,610,072 discloses a round shoulder self-piercing nut and installation head, both of which are assigned to the assignee of the present invention. Self-clinching fasteners and installation heads are also used in mass production, wherein the fastener is installed in a pre-pierce panel opening, such as disclosed in U.S. Pat. No. 3,938,239. Further, self-riveting fastening elements may be installed by a similar installation head and installation heads are used in mass production to install weld nuts and the like. In mass production, a proximity switch or other sensor means is provided to indicate the presence of a self-attaching fastening element ready for installation prior to activating the installation head.

Various means have been tried to clean the fastening element sensor during installation. For example, a jet of air has been directed through the fastener inlet passage against the window of the proximity switch, which engages the proximity switch each time the plunger is retracted. This means of cleaning the proximity switch has not, however, proven sufficiently reliable, particularly in mass production applications where several operations are performed with each stroke of the die press, such as described above. The need therefore remains for a more reliable means of cleaning the self-attaching element sensor means, preferably during installation of the fastening elements and not requiring down time of the die press.

SUMMARY OF THE INVENTION

The sensor cleaning means of this invention is particularly, although not exclusively adapted for conventional installation heads, such as it utilized for attaching self-attaching fastening elements, including self-piercing, self-clinching or self-riveting fastening elements utilized by mass production industries, including automotive manufacturers. Typically, such installation heads include a first passage which receives the self-attaching fastening elements, a second passage which intersects and communicates with the first passage, a plunger which reciprocates in the second passage through the intersection of the first and second passages, feed means which feeds the self-attaching fastening elements through the first passage into the intersection of the passages, beneath the free end of the plunger, for installation by the plunger through the second passage. As described, a fastening element sensor means, such as a proximity switch, is located in the second passage, opposite the first passage, for sensing the presence of a self-attaching fastening element beneath the plunger, ready for installation.

The sensor element cleaning means of this invention includes an air passage in the plunger having an outlet, preferably spaced from the plunger free end, which is directed toward the sensing element and a source of pneumatic pressure which communicates with the plunger air passage, directing a jet of air under pressure through the outlet. The air jet sweeps across the sensing element as the plunger reciprocates through the intersection of the first and second passages during each installation of a self-attaching fastening element, thereby cleaning the sensor element. The plunger air passage may comprise an axial bore and the outlet preferably extends at an obtuse angle relative to the axial bore, directing an air jet against the sensor element at an acute angle, which sweeps across the sensor element each time the plunger is actuated. In the most preferred embodiment, the outlet comprises a plurality of generally parallel outlet bores, which sweep sequentially across the sensor element as the plunger reciprocates through the second passage. This cleaning means in a plunger-type installation head has proven very effective in removing oil, burs, chips and other debris which collect on the proximity probe in normal operation. The debris is swept by the air jets through the outlet of the second passage, removing the debris from the installation head, without requiring interruption of the installation of self-attaching fastening elements. As described, this is a very important advantage of the installation head of this invention, particularly where a plurality of installation heads are installed in a die press.

Other advantages and meritorious features of the installation head of this invention will be more fully understood from the following description of the preferred embodiments, the appended claims and the drawings, a brief description of which follows.

BRIEF DESCRIPTION OF THE DRAWINGS

FIG. 2 is an exploded side elevation of the principal components of an installation head illustrating one embodiment of the modifications to the plunger to provide a cleaning means;

FIG. 3 is a side partially cross-sectioned view of an installation head as shown in FIG. 2 with a self-attaching fastening element ready for installation; and FIG. 4 is a partially cross-sectioned side view of FIG. 3 during installation of the self-attaching fastening element and cleaning of the sensor means.

DESCRIPTION OF THE PREFERRED EMBODIMENT OF THE INVENTION

Figure 1:
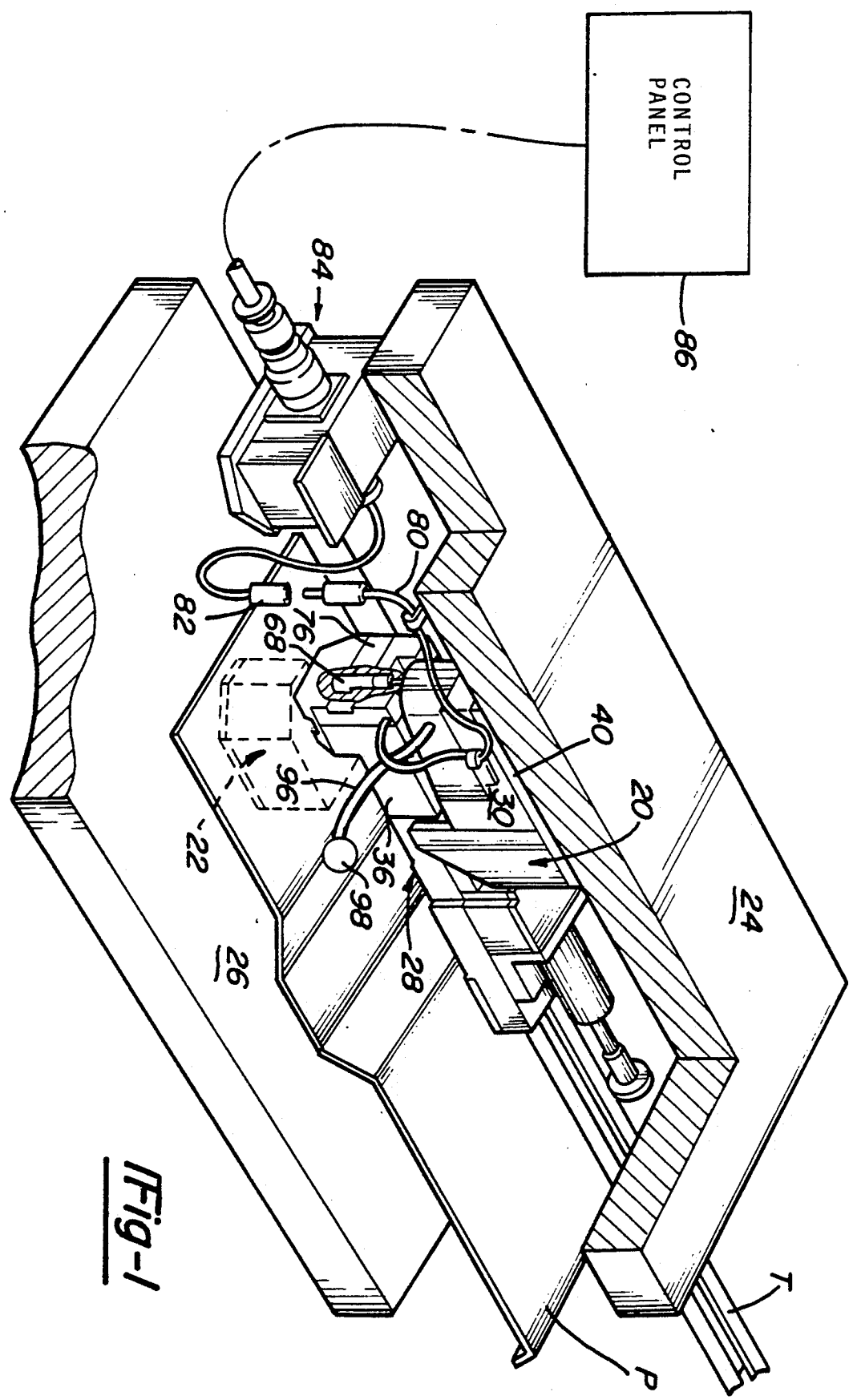
FIG. 1 is a partially cross-sectioned top plan view of an installation head for attaching self-attaching fastening elements of the type described herein installed in a die press including the improved sensor element cleaning means of this invention.

As described, the installation head of this invention is adapted for attaching self-attaching fastening elements, including pierce nuts, clinch nuts, self-riveting fastening elements, self-piercing and attaching studs, nuts or any self-attaching fastening element installed in a plunger-type installation head. The installation head will be described herein in relation to a pierce nut installation head for illustrative purposes only. As will be understood, however, the sensor element cleaning means disclosed herein may be adapted to any plunger-type installation head and the installation head of this invention is therefore not limited in any way to pierce nuts.

Pierce nuts have been used in mass production by automobile manufacturers for over 35 years. The original or universal pierce nut includes a rectangular pilot portion which is driven into the panel to pierce a rectangular slug from the panel, opposed flange portions which engage the panel and prevent push-through of the pierce nut and grooves undercut in the sides of the pilot or body portion which receive the panel during clinching and which prevent pullout of the pierce nut. Thus, the pierce nut is permanently installed in the panel by the installation head assembly as disclosed in the U.S. Pat. Nos. 2,707,322 and 3,091,843, both assigned to the assignee of the instant invention. U.S. Pat. No. 3,089,360 discloses a commercial embodiment of an installation head for attaching pierce nuts of the type shown in FIG. 1, also assigned to the assignee of the present invention. U.S. Pat. No. 3,829,957, also assigned to the assignee of the present invention, discloses a second embodiment of a pierce nut marketed by the assignee under the tradename "Hi-Stress", which is also installed by a plunger-type installation head of the type disclosed herein. As set forth in the above reference United States patents of the assignee of the present invention, pierce nuts are presently installed by the automobile industry in steel panels, generally low-carbon steel or a low-carbon deep draw steel having a thickness between about 0.025 to 0.125 inches or greater. The self-attaching fasteners are preferably formed of a medium carbon steel, such that the pierce nut can be installed in the panel without deformation of the pierce nut. More recently, the assignee of the present invention has introduced self-attaching "PIERCEFORM" fasteners, including stud-type and nut fasteners, as disclosed in the above-referenced United States patents, wherein a portion of the fastener is deformed during installation to secure the fastener to the panel.

FIG. 1 illustrates a typical installation assembly for a conventional or universal pierce nut, wherein the installation head assembly 20 and die button 22 are installed in a die press assembly which may be utilized to simultaneously form a configured panel or metal sheet P, such as a automobile body panel. In the disclosed embodiment of the assembly, the installation head assembly 20 is installed in the upper die shoe and the die button 22 is installed in the lower die shoe 26 for a "down-pierce" installation. It will be understood, however, that the installation head 20 may be installed in the lower die shoe 26 and the die button 22 may be installed in the upper die shoe 24 for an "up-pierce" installation. In the disclosed installation, the pierce nuts are received through a track T which communicates with a source of pierce nuts, such as a hopper or coiled reel, as described in the prior patents of the assignee of the present invention. The operation of the head assembly 20 is described more fully in U.S. Pat. No. 3,108,368 assigned to the assignee of the present invention. As more fully described therein, the head assembly includes a pierce nut feed mechanism 28 which feeds the pierce nuts from the track T to the nose assembly 32 for installation of the pierce nuts in the panel P. In the disclosed embodiment, however, the pierce nuts are received from a coiled reel of a strip of interconnected pierce nuts as disclosed in U.S. Pat. No. 3,845,860, also assigned to the assignee of the present invention.

The components of the installation head assembly 20 relevant to the present invention are shown in FIGS. 2-4, including the base member 30, the nose assembly 32 and the plunger or punch 34. The base member 30 is attached to a back-up plate 40 (see FIG. 1) which is bolted to the upper die shoe 24 by bolts, not shown. Prior to attaching the base member 30 to the back-up plate 40, the plunger or punch 34 is received through the cylindrical bore 42 in the base member 30 and fixed in place with the top surface 44 of the punch 34 substantially flush with the top surface 46 of the base member 30. The base member 30 is then fixed to the back-up plate 40 by suitable bolts, not shown, which are received through threaded apertures 48 in the base member. A locator pin, not shown, is also attached to the back-up plate and received through aperture 50 in the base member to accurately locate the base member and plunger 34 in the assembly.

As disclosed in above-referenced U.S. Pat. No. 3,108,368 of similar construction to the embodiment shown in FIG. 1, the nose assembly 32 moves relative to the base member 30, such that the plunger 34 reciprocates through a passage in the nose assembly 32, as described below. As disclosed in above-referenced U.S. Pat. No. 3,108,368, a large coil spring, not shown, is received in bore 52 which extends through the base member 30. The spring is biased against upper die shoe 24 at one end and the opposite end is biased against feed block 36 of the feed mechanism 28, which is connected to nose assembly 32. As shown in FIG. 1, the nose assembly is normally biased downwardly, away from the base member 30 as described in the above-referenced patent and discussed herein below.

The nose assembly 32 in the disclosed embodiment is conveniently formed in two parts 54 and 56 which are bolted together by bolts, not shown, received through apertures 58. One part 56 of the nose assembly 32 includes a channel which receives the reciprocating plunger, as now described in regard to FIGS. 3 and 4. As shown in FIGS. 3 and 4, the feed block and nose part 56 have aligned pierce nut receiving Passages 62 and 64, respectively. As shown in FIG. 3, a pierce nut 10 is fed beneath the free end of the plunger 34 for installation by the pierce nut installation head. As described in the above-referenced patents of the assignee, pierce nuts are fed through the passages 62 and 64 beneath the free end of the plunger, with each stroke of the press, by feed mechanism 28.

The presence of a pierce nut beneath the free end of the plunger in a position ready for installation as shown in FIG. 3 is sensed by a proximity probe or switch 68. As shown in FIG. 2, the proximity switch 68 is assembled in a configured slot 70 in part 54 of the nose assembly 32. The proximity switch includes a window 72 which is received through an opening 74 in nose assembly part 54 to sense the Presence of a pierce nut 10 in position for installation, as shown in FIG. 3. The proximity switch is secured in slot 70 by a retainer plate 76 as shown in FIG. 3. The proximity switch 68 shown is Model MSE-7P available from Balluff, Inc. of Florence, Ky. As will be understood, however, the installation head of this invention is not limited to any particular sensor means or sensing element, but the proximity switch disclosed is one type of sensor means suitable for sensing the presence of pierce nuts. When a pierce nut is located opposite the window 72 of the proximity switch 68, the proximity switch closes the circuit and allows operation of the die press. As shown in FIG. 1, the proximity switch 68 is connected by electric line 80 to a quick-connect coupling 82, which is connected to coupling 84 mounted on the upper die shoe 24. The coupling 84 is then connected to the control panel 86.

When the die press is actuated by a switch on control panel 86, one of the die shoes 24 or 26 is moved toward the other die shoe to close the die press. As described above, the die press may include several pierce nut installation heads 20 and die buttons 22 and the panel P may be simultaneously formed by die platens, not shown, attached to the upper and lower die shoes. In a typical operation, the upper die shoe 24 is lowered under hydraulic pressure toward the lower die shoe 26, closing the die press to form the panel P into a contoured configuration and simultaneously installing one or more pierce nuts. If, however, the proximity switch 68 does not sense a pierce nut 10 opposite the window 72 beneath the free end of the plunger, ready for installation, the press cannot be actuated. Instead, a light or other signal will appear on the control panel 86 indicating that a pierce nut is not located in the installation head 20 ready for installation. The operator then checks the supply of pierce nuts and replenishes the supply, as needed. Occasionally, however, a pierce nut may become jammed in the feed mechanism 28, requiring service of the installation head 20.

If, however, the window 72 of the proximity switch becomes fouled with oil, burs, chips or other debris, the proximity switch may falsely indicate the presence of a pierce nut 10 in the ready position as shown in FIG. 3. If this happens, the die press may be actuated to relatively close the upper and lower die shoes 24 and 26, respectively, and a pierce nut will not be installed in the panel. This is a particular problem when the panel is simultaneously formed into a contoured configuration and where several pierce nuts are installed simultaneously. In most instances, the pierce nut must then be installed by hand or the part must be scrapped.

Upon actuation of the die press in the embodiment shown in FIG. 1, the upper die shoe 24 moves toward the lower die shoe 26 until the nose assembly 32 engages the panel P as shown in FIG. 3. Continued movement of the upper die shoe 24 toward the lower die shoe 26 compresses the coil spring in bore 52, as disclosed in the above-referenced U.S. Pat. No. 3,108,368, causing the plunger 34 to move through the plunger passage 60 to install the pierce nut 10 in the panel, as shown in FIG. 4. Details of the operation of the pierce nut installation head are disclosed in the above-referenced '368 patent. The pierce nut 10 is driven against the panel P to pierce the panel and the die button 32 simultaneously deforms the edge of the panel surrounding the pierced opening into grooves in the pierce nut, not shown, clinching the pierce nut to the panel. If, however, a pierce nut is not located in the ready position and the window 72 of the proximity switch 68 is fouled with debris, the die press may be actuated and no pierce nut is installed in the panel, as described above.

As briefly described above, the pierce nut installation head of this invention includes a cleaning means which cleans the window 72 of the proximity switch 68 each time the press is cycled. The plunger 34 in the disclosed embodiment includes an axial bore or air passage 90, see FIG. 4, which communicates with a transverse port 92 adjacent the upper end 44 of the plunger. The inlet port 92 communicates with a port 94 in the side of the base member 30, which is connected by pneumatic line 96 to a source of pneumatic pressure 98. In the preferred embodiment, the outlet of air passage 90 comprises a plurality of outlet bores 100 which are generally parallel and spaced along the longitudinal axis of the plunger 34. As shown, each of the outlet bores 100 define an obtuse angle with the axial bore 90, such that the outlets extend at an angle toward the sensor element located opposite window 72 of the proximity switch 68.

Thus, as the plunger or punch 94 reciprocates through the intersection of the pierce nut receiving passage 64 and the plunger passage 60, the air jets generated through the outlet ports 100 sequentially sweep across the window 72 of the proximity switch as shown in FIG. 4. This sweeping action cleans the window 72 of oil, chips and other debris which may otherwise accumulate on the window 72, giving a false reading.

When the die press is opened, the plunger 34 first reciprocates upwardly through the plunger passage 60 to the position shown in FIG. 3. As the die press is further opened, the nose assembly 32 is lifted from the panel as disclosed in the above-referenced U.S. Pat. No. 3,108,368. As will be understood by those skilled in the art, the air supply to line 96 may be timed to supply pneumatic pressure only when the outlet ports 100 are sweeping across the window 72 of proximity switch 68, during cycling of the press. The sweeping action by a plurality of angularly related air jets through outlet ports 100 has been found to be particularly effective in cleaning the window 72 of the proximity switch 68, thus eliminating the problem of false readings of the proximity switch. As shown in FIG. 4, the oil, chips and other debris are swept from the window through the channel 102 out of the nose assembly.

The installation head of this invention thus eliminates the problem of false readings by the proximity switch 68. The oil, chips and other debris are efficiently cleaned from the window 72 of the proximity switch, eliminating the requirement for periodic cleaning of the window 72 and cycling of the die press when no pierce nut 10 is located beneath the free end of the plunger 34, ready for installation.

We claim:

1. An installation head for attaching self-attaching elements to a work-piece, said installation head including a first passage receiving said self-attaching fastening elements, a second passage intersecting and communicating with said first passage, a plunger reciprocating in said second passage through said intersection of said first and second passages, feed means feeding said self-attaching fastening elements through said first passage into said intersection of said first and second passages beneath a free end of said plunger for installation by said plunger through said second passage in said work-piece, sensor means including a sensing element in said second passage opposite said first passage, said sensing means sensing the presence of a self-attaching fastening element in said second passage beneath said plunger free end ready for installation, and cleaning means periodically cleaning said sensing element, said cleaning means including an air passage in said plunger having a generally laterally extending outlet passage spaced from said plunger free end directed toward said sensing element and a source of pneumatic pressure communicating with said plunger air passage, said cleaning means directing a jet of air under pressure through said plunger outlet passage which sweeps across said sensing element as said plunger reciprocates through said intersection of said first and second passages cleaning said sensor element, and said outlet passage comprises a bore extending towards said free end and defining an obtuse angle relative to the reciprocating axis of said plunger toward said sensing element.

2. The installation head for attaching self-attaching fastening elements defined in claim 1, characterized in that said outlet passage comprises a plurality of bores communicating with said air passage directing a plurality of air jets which sequentially sweep across said sensing element as said plunger reciprocates through said intersection of said first and second passages.

3. An installation head for attaching self-attaching fastening elements in a work-piece, said installation head including a first passage receiving said self-attaching fastening elements, a second passage extending generally perpendicular to said first passage and communicating with said first passage, an elongated plunger reciprocating in said second passage through said intersection of said first and second passages, feed means feeding said self-attaching fastening elements through said first passage into said intersection of said first and second passages beneath a free end of said plunger for installation by said plunger through said second passage in said work-piece, said plunger having a longitudinal air passage communicating with an outlet bore spaced from said free end and extending towards said free end at an obtuse angle relative to said air passage and at an acute angle toward said sensing element, and pneumatic supply means including a source of pneumatic pressure communicating with said plunger air passage supplying air under pressure to said plunger air passage, said plunger outlet bore directing a jet of air under pressure which sweeps angularly across said sensing element as said plunger reciprocates through said intersection of said first and second passages thereby cleaning said sensing element.

4. The installation head for attaching self-attaching fastening elements as defined in claim 3, wherein said plunger includes a plurality of outlet bores spaced along the longitudinal axis of said plunger communicating with said air passage, said outlet bores each defined at an obtuse angle relative to said air passage and said outlet bores directing a plurality of air jets under pressure at an acute angle toward said sensing element which sequentially sweep across said sensing element as said plunger reciprocates through said intersection of said first and second passages.

5. The installation head for attaching self-attaching fastening elements defined in claim 4, wherein said plunger includes a side channel and said outlet bores communicate with said side channel.

6. An installation head for attaching self-attaching fastening elements to a work-piece, said installation head including a first passage receiving said self-attaching fastening elements, a second passage extending generally perpendicular to and intersecting said first passage, an elongated plunger reciprocating in said second passage through said intersection of said first and second passages, feed means feeding said self-attaching fastening elements through said first passage into said intersection of said first and second passages beneath a free end of said plunger for installation by said plunger through said second passage, a proximity switch having a sensing element in said second passage opposite said first passage, control means connected to said proximity switch actuating said plunger to reciprocate through said intersection of said first and second passages when said proximity switch indicates that a self-attaching element is located beneath said plunger free end ready for installation, said plunger having an axial bore communicating with an outlet bore extending generally laterally toward said proximity switch sensing element, and pneumatic supply means including a source of pneumatic pressure communicating with said plunger axial bore supplying air under pressure to said outlet bore directing a jet of air under pressure which sweeps across said proximity switch sensing element as said plunger reciprocates through said intersection of said first and second passages, thereby cleaning said sensing element, said plunger outlet bore extends toward said free end and defines an obtuse angle to said axial bore toward said sensing element.

7. The installation head for attaching self-attaching fastening element defined in claim 6, wherein said plunger outlet bore defines an obtuse angle to said axial bore toward said sensing element.

8. The installation head for attaching self-attaching fastening elements defined in claim 6, wherein said plunger includes a plurality of generally parallel outlet bores along the axis of said plunger communicating with said axial passage directing a plurality of air jets sequentially across said sensing element as said plunger reciprocates through said intersection of said first and second passages, thereby cleaning said sensing element.

9. The installation head for attaching self-attaching fastening elements as defined in claim 8, characterized in that said outlet bores communicate with said axial bore along the longitudinal axis of said axial bore.

10. The installation head for attaching self-attaching fastening elements defined in claim 9, wherein each of said outlet bores define an obtuse angle relative to said axial bore directing a plurality of jets of air under pressure which sequentially sweep angularly across said sensing element as said plunger reciprocates through said intersection of said first and second passages.

11. An installation head for attaching self-attaching elements to a work-piece, said installation head including a first passage receiving said self-attaching fastening elements, a second passage intersecting and communicating with said first passage, a plunger reciprocating in said second passage through said intersection of said first and second passages, feed means feeding said self-attaching fastening elements through said first passage into said intersection of said first and second passage beneath a free end of said plunger for installation by said plunger through said second passage in said work-piece, sensor means including a sensing element in said second passage opposite said first passage, said sensing means sensing the presence of a self-attaching fastening element in said second passage beneath said plunger free end ready for installation, and cleaning means periodically cleaning said sensing element, said cleaning means including an air passage in said plunger having a generally laterally extending outlet passage spaced from said plunger free end directed toward said sensing element and a source of pneumatic pressure communicating with said plunger air passage, said cleaning means directing a jet of air under pressure through said plunger outlet passage which sweeps across said sensing element as said plunger reciprocates through said intersection of said first and second passages cleaning said sensor element, said plunger air passage outlet comprises a bore extending towards said free end and defining an obtuse angle relative to the reciprocating axis of said plunger toward said sensing element and said outlet passage comprising a plurality of bores communicating with said air passage directing a plurality of air jets which sequentially sweep across said sensing element as said plunger reciprocates through said intersection of said first and second passages.

12. The installation head for attaching self-attaching fastening elements defined in claim 11, wherein said plunger outlet passage comprises a bore defining an obtuse angle relative to the reciprocating axis of said plunger toward said sensing element.

* * * * *